(12) United States Patent
Sauer

(10) Patent No.: US 12,350,722 B2
(45) Date of Patent: Jul. 8, 2025

(54) TAPPING POINT CLEARING APPARATUS

(71) Applicant: ClearGuard IPCo Pty Ltd, Jandakot (AU)

(72) Inventor: Hans Ernst Sauer, Jandakot (AU)

(73) Assignee: ClearGuard IPCo Pty Ltd, Jandakot (AU)

( * ) Notice: Subject to any disclaimer, the term of this patent is extended or adjusted under 35 U.S.C. 154(b) by 148 days.

(21) Appl. No.: 17/769,088

(22) PCT Filed: Oct. 15, 2020

(86) PCT No.: PCT/AU2020/051108
§ 371 (c)(1),
(2) Date: Apr. 14, 2022

(87) PCT Pub. No.: WO2021/072494
PCT Pub. Date: Apr. 22, 2021

(65) Prior Publication Data
US 2024/0042500 A1   Feb. 8, 2024

(30) Foreign Application Priority Data
Oct. 18, 2019 (AU) .................. 2019903931

(51) Int. Cl.
*B08B 9/043* (2006.01)
*B08B 9/047* (2006.01)

(52) U.S. Cl.
CPC ............ *B08B 9/0436* (2013.01); *B08B 9/047* (2013.01); *B08B 2209/04* (2013.01)

(58) Field of Classification Search
CPC ... B08B 9/0436; B08B 9/027; B08B 2209/04; B08B 9/047
See application file for complete search history.

(56) References Cited

U.S. PATENT DOCUMENTS 3,983,938 A    10/1976   Hellums et al.
5,068,940 A *  12/1991   Sheppard ................ B08B 9/027
                                                              15/302

(Continued)

FOREIGN PATENT DOCUMENTS

CN    108691753 A    10/2018
DE    10145274 A1    4/2003

(Continued)

OTHER PUBLICATIONS

International Search Report and Written Opinion for Application No. PCT/AU2020/051108 dated Nov. 30, 2020 (14 pages).

(Continued)

*Primary Examiner* — Andrew A Horton
(74) *Attorney, Agent, or Firm* — Michael Best & Friedrich LLP

(57) ABSTRACT

A clearing head 10 includes annular scraper edge (12) and rows of openings (14, 16). A clearing tool (100) has a one-piece combined shaft (24) and clearing head (10). Wiper ring (49) includes inner first material 49*a* around an opening (49*c*) for the shaft (24). The first material may have molybdenum/molybdenum disulphide. A resilient second material 49*b* is provided around the first material. The resilient second material is or includes FKM. In a ram (38), the resilient second material can exert inward radial pressure to the first material by reacting against a ram interior wall (39). The ram can incline from horizontal and vertical by an angle α e.g. between at least 10° and 80°, or between at least 20° and 70°, or between at least 30° and 60°, or between at least 25° and 45°, or around 30°.

14 Claims, 7 Drawing Sheets

(56) References Cited

U.S. PATENT DOCUMENTS

| | | | |
|---|---|---|---|
| 5,617,609 | A | 4/1997 | Bently |
| 6,363,566 | B1 | 4/2002 | Collins |
| 6,574,821 | B1 | 6/2003 | Dal Maso et al. |
| 2003/0019058 | A1* | 1/2003 | Pettersson ................. B08B 9/00 15/104.03 |
| 2014/0047651 | A1 | 2/2014 | Sauer et al. |
| 2015/0258586 | A1 | 9/2015 | Harr |
| 2017/0211472 | A1* | 7/2017 | Heo .................... A46B 13/001 |

FOREIGN PATENT DOCUMENTS

| | | |
|---|---|---|
| WO | 2002036276 A1 | 5/2002 |
| WO | 2005012772 A1 | 2/2005 |
| WO | 2011026619 A1 | 3/2011 |
| WO | 2019161493 A1 | 8/2019 |

OTHER PUBLICATIONS

Gulf Cooperation Council (GCC) Patent Office Examination Report for Application No. 202040654 dated Dec. 1, 2021 (3 pages).
European Patent Office Extended Search Report for Application No. 20877829.0 dated Dec. 15, 2023 (7 pages).
Canadian Patent Office Action for Application No. 3154272 dated Feb. 14, 2024 (5 pages).
European Patent Office Action for Application No. 20877829.0 dated Apr. 23, 2025 (8 pages).

* cited by examiner

TAPPING POINT CLEARING APPARATUS

FIELD OF THE INVENTION

The present invention relates to improvements to apparatus for clearing process tapping points in industrial and mineral processing operations. Such tapping points are generally used within process measurement systems.

BACKGROUND TO THE INVENTION

The processing industry relies upon the accurate measurement of process variables to enable efficient control of industrial processes. One of the most common methods of taking various process measurements is via process tapping points exposed to the interior contents of a process vessel or pipeline. Flow, level and/or pressure measurement through an internal bore of the tapping points is indicative of certain process variables.

Such tapping points encounter progressive scaling or debris build-up over time within their internal bores. The restriction or blockage of process tapping points by scaling or debris build-up can cause inaccurate process measurement, inaccurate product sampling or even render the process measurement completely unavailable.

Therefore, when process tapping points are blocked or restricted to the point of affecting the accuracy of the process measurement, they need to be cleared.

Traditional methods used in the clearance of process tapping points include the removal of the blocking material using manual or power tools whilst the process is online. Given the toxic and/or flammable nature of most process fluids, this can be a highly hazardous operation for even the most experienced operators.

Another method used to maintain the clearance of the process tapping points is the introduction of a purge fluid through the tapping points. This purge fluid passes continuously through the tapping point, delaying the settling of scaling or debris. The disadvantage of this method is that it adds a large amount of inert media to the process fluid that must later be extracted at significant expense to maintain process efficiency. Further, the introduction of purge fluid through the tapping point does not stop the tapping point blocking, but merely delays the blocking.

Similarly, another way of slowing blockage is to provide larger diameter tapping points so that the time taken to block is longer. Large, oversize process connections have been utilised to provide for longer periods where accurate process measurements can be obtained. This arrangement merely delays the inevitable need to clear the process tapping points. Oversize process connections are also more expensive to install than conventional connections.

International application publication number WO02/36276, the contents of which are incorporated herein by reference, discloses an automated tapping point clearing apparatus. The apparatus includes a clearing tool attached by a screw thread arrangement to an end of the reciprocating piston shaft connected to a piston. The clearing tool includes a scraper ring that clears debris built up on an internal bore of a tapping point. The clearing tool also includes a plurality of apertures to allow fluids to flow through the clearing tool during a cleaning operation thereby maintaining accurate process variable measurement even during the passage of the clearing tool through the aperture.

Tapping point clearing apparatuses made in accordance with the aforementioned international application have proved useful and reliable. Nonetheless, certain deficiencies in their use have become apparent.

Vibration, changes of temperature between the clearing tool and shaft, and high velocity impacts with build-up of scale over time, can cause the clearing tool to loosen and unscrew from the thread attachment on the shaft.

To alleviate this issue, a liquid thread lock or sealant has previously been used to help retain the clearing head on the shaft and prevent premature unscrewing of the clearing tool from the shaft. However, thread lock/sealant can be subject to harsh working environments in process flows, such as high temperatures and/or caustic solutions. The thread lock/sealant can erode and break-down, allowing the clearing tool to unscrew and small particles of thread lock/sealant can contaminate the process solution.

Alternatively, or in addition, a grub screw has been used to retain the clearing head threaded on the shaft. However, a grub screw can loosen due to vibration and/or temperature effects, allowing the clearing head to unscrew from the shaft.

Known tapping point clearing apparatus utilise seals to retain pressure within a ram (such as a pneumatic ram). Typical materials for the seals are polymerized tetrafluoroethylene (aka Teflon) or graphite based.

To prevent the seals becoming contaminated and/or failing prematurely, a wiper ring can be provided in front of (process side) of the seals to wipe debris and fluid from the retracting shaft during process clearing actions of the tapping point clearing apparatus. For example, a single material Polyparaphenylene terephthalamide (aka Kevlar) wiper ring may be used in a tapping point clearing apparatus for an alumina production process involving caustic, high temperature, highly alkaline solutions.

However, high temperatures, temperature fluctuations and harsh pH conditions cause deterioration of such wiper rings. Improvement in the structure, materials and/or location of the wiper ring(s) in a tapping point clearing apparatus would be beneficial.

It is generally the case that process tapping points are horizontal or vertical. Prior to remotely actuated/automatic tapping point clearance tools, technicians would manually 'rod out' the plugged tap every week, 2 weeks or even monthly, to remove scale that displaced purge fluid and settled inside the isolation valve. The isolation valve was therefore operated reasonably regularly such that any scale in its bore tended not to be solidified dangerously and so closing the valve before fitting the manual rod out tool was usually safe.

However, with automatic/remotely operated tapping point clearing apparatus/tools, which typically have a 16 mm or 20 mm outside diameter (O.D.) scraper (clearing head) passing through a 20-50 mm diameter isolation valve bore. After a period of time, perhaps 1-2 years, scale settles and hardens in the bore of the isolation valve between the O.D. of the scraper passing through and the inside diameter (I.D.) of the isolation valve. When the tapping point clearing tool/apparatus is due for removal for servicing, the isolation valve may not move or operate correctly. Because the automatic/remotely operated tapping point clearing tool/apparatus has worked so well for so long, the isolation valve rarely, if at all, gets exercised other than when the tapping point clearing tool/apparatus is serviced.

One or more forms of the present invention has been created in light of these practical deficiencies in the operation of known tapping point clearing apparatus.

Although described with reference to process industry it would be clear to a person skilled in the art that the present invention has applicability to a number of industries where access is required to a pipe or vessel that scales during use.

SUMMARY OF THE INVENTION

With the aforementioned in mind, an aspect of the present invention provides a clearing tool for a ram for use in a process tapping point clearing apparatus, the clearing tool having a permanently connected shaft and clearing head.

One or more aspects of the present invention provides a clearing tool for a ram for use in a process tapping point clearing apparatus, the clearing tool including a one-piece shaft and head.

The term 'clearing head' may be substituted by 'scraper head' or 'scraper', all meaning the working scraper end of the tapping point clearing apparatus that does the clearing work to remove scale/build up.

It will be appreciated that the clearing tool provides a one-piece product.

Preferably the clearing head and shaft may be made without separate attachment means for otherwise connecting the clearing head to the shaft.

However, one or more embodiments encompasses the clearing head being created as a discrete component and fixedly/permanently attached to the shaft, such as by welding, brazing or other no releasable attachment.

Thus, preferably the clearing tool includes the clearing head welded to or otherwise non-releasably connected to the shaft.

With regard to a separately made clearing head, when the clearing head is mounted to the shaft, a channel may be defined between a part of the clearing head and part of the shaft, the channel receiving weld connecting the clearing head and shaft together.

An end of the shaft may be received into the clearing head. The shaft may include a stepped end such that a reduced diameter end of the shaft is received into the clearing head, and an outside diameter surface portion of the clearing head provides a diameter matching an outside diameter of a wider diameter portion of the shaft than the reduced diameter end. Thereby, a continuous or near continuous outer surface of the clearing head and of the shaft is maintained.

Weld between the clearing head and the shaft can be ground/polished to ensure continuity of outer surface from the clearing head to the shaft.

The shaft may have a connection end distal from the clearing tool, the connection end including connection means for attachment of the clearing tool to a piston of the ram.

A ram may include a one-piece shaft and head clearing tool.

A further aspect of the present invention provides a tapping point clearing apparatus including a ram having a clearing tool, the clearing tool including an integral shaft and clearing head.

The clearing head preferably includes a scraper ring for removal of build-up/scale from a tapping point and/or at least one aperture therethrough for fluid flow through the clearing head.

The clearing tool (combined clearing head and shaft) may be machined from a single blank of material, such as a metal billet, preferably being of stainless steel.

The ram may include a cylinder for housing the piston, first and second opposed end covers for sealing opposed ends of the cylinder, and at least one tie member for use in clamping the opposed end covers to the ends of the cylinder. One of the end covers preferably includes an opening therethrough for the shaft.

It will be appreciated that replacement of the clearing head may be wider than the opening through the respective cover.

Assembly of the ram can therefore be by way of inserting the distal end of the shaft through the cover opening, attaching the piston to the distal end of the shaft, and inserting the piston into the cylinder.

The respective covers can be used to seal the ends of the cylinder with the tie(s) extending between the covers and clamping the covers to the ends of the cylinder.

Disassembly for replacement of a worn/damaged clearing head or shaft can be by reversal of the assembly procedure.

A wiper ring may be provided as a separate replacement component

A further aspect of the present invention provides a wiper ring for, in use, wiping a stroking shaft of a ram used in a tapping point clearing apparatus, the wiper ring having a composite structure including a first material around a central opening of the wiper ring and a second material at least partially around the first material, wherein the second material is resilient.

Preferably, the second material includes a resilient material.

Preferably, the second material provides an external periphery of the wiper ring.

The first material may include or be of metal or be metal based, such as molybdenum, forming the inner material.

Preferably the second material includes a synthetic rubber and/or fluoropolymer elastomer. Preferably the second material includes FKM (aka Viton™). FKM is a family of fluoroelastomer materials that contain vinylidene fluoride as a monomer. FKM is generally compatible with hydrocarbons and caustic slurries. FKM can withstand a greater range of temperatures (e.g. −20° C. to +205° C.) than other compounds such as Neoprene and Buna N. FKM has exceptionally good resistance to atmospheric oxidation and has low burning characteristics.

Preferably the FKM includes an elastomer in the family including one of, or a combination of two or more of, the following: copolymers of hexafluoropropylene (HFP) and vinylidene fluoride (VDF or VF2), terpolymers of tetrafluoroethylene (TFE), vinylidene fluoride (VDF) and hexafluoropropylene (HFP) as well as perfluoromethylvinylether (PMVE) containing specialties.

Preferably the fluorine content is between 66% and 70%.

Preferably the resilient second material has a density of over 1800 $kg/m^3$.

The first material may include a metal, such as molybdenum. The first material may include molybdenum disulphide impregnated polyurethane.

It will be appreciated that the wiper ring includes the first material to wipe clean the stroking shaft of the clearing tool, and the second material being resilient compensates for temperature fluctuations caused by the relatively cool shaft repeatedly extending into a hot process flow, expanding and then retracting, or temperature effects through the cover(s)/cylinder.

Preferably the second material acts as a resilient means (e.g. as a spring) to compensate for movements in the shaft during its stroke.

In turbulent, vibrating installations, the shaft will move and resilience in the second material ensures the first material remains in contact with the shaft.

The second material may be compressed when the wiper ring is mounted within a ram of a tapping point clearing apparatus of one or more forms of the present invention. Thus, the second material can provide a radially force directed inwards to ensure that the first material contacts with and wipes the shaft during shaft retraction (and extension) to protect the seal(s).

Preferably the wiper ring is provided in addition to at least one sealing ring and/or at least one secondary wiper ring.

The at least one secondary wiper ring may include Kevlar (poly paraphenylene terephthalamide).

The at least one sealing ring may include a synthetic resin, such as polymerized tetrafluoroethylene or polytetrafluoroethylene aka Teflon, and/or a graphite material such as graphoil.

It will be appreciated that the wiper ring according to one or more embodiments of the present invention sits in front of (process side) the sealing rings to wipe clean the shaft to prevent contamination damaging the sealing rings.

A clearing head for a tapping point clearing apparatus, the clearing head may have one or more increased hole openings in terms of number and or size.

Another aspect of the present invention provides a clearing head for a tapping point clearing apparatus, the clearing head including at least one opening therethrough for purge fluid to flow through the clearing head.

Preferably, the clearing head includes multiple said openings.

The multiple openings may be provided two or more rows of said openings positioned circumferentially around the clearing head.

The rows of openings may be spaced such that the openings of one row are axially aligned along the clearing head with respect to another row of the openings.

Alternatively, the rows of openings may be spaced such that the openings of one row are offset with respect to the openings of another row. For example, one row may have spaced openings around the clearing head, and a second row may have openings axially offset and circumferentially offset so as to align with the spaces between the openings of the first row.

The multiple openings increase the total opening area through the clearing head compared with a standard clearing head.

Even if the clearing head becomes jammed/stuck in a tapping point clearance point (i.e. stuck with ram shaft extended) flow through the clearing head is sufficient to allow purge to occur or continue, thereby protecting the process equipment and process flow and continues to allow for accurate process variable measurement.

Preferably the total opening area is at least equal to a cross sectional area of the interior of a flow conduit, impulse line or pipe, preferably of a purge flow conduit/pipe.

The area may be at least 80 mm$^2$, more preferably at least 82 mm$^2$, and yet more preferably at least 86 mm$^2$.

It will be appreciated that the total area through the openings of the clearing head reduces or avoids induced pressure measurement errors (such as purge pressure spiking) within the flow process.

For example, when the clearing head is advanced into a tapping point opening, the clearing had partially occludes the opening thereby hindering purge flow. To avoid or reduce pressure spikes resulting from the clearing head occluding the tapping point opening, one or more forms of the present invention maintains a minimum opening area (even if the clearing tool is in the tapping point opening).

A further aspect of the present invention provides a clearing head for a tapping point clearing apparatus, wherein the clearing tool has at least one opening therethrough for purge flow, the at least one opening providing an opening area at least as large as a purge flow conduit cross sectional area to the tapping point.

A tapping point clearing apparatus, such as a ram, installed at an incline (non-horizontal) e.g. such that the clearing head and shaft advance downwards and forwards, helps to optimise process variable measurement.

A further aspect of the present invention provides a tapping point clearing apparatus, including a ram for extending and retracting a tapping point clearance tool, the ram inclined from horizontal and inclined from vertical.

Such an inclined apparatus helps to improve process efficiency and reduce process dilution.

In most processes, the inert purge flow has a lower density than the process inside the vessel or pipe.

A tapping point clearing apparatus (e.g. ram) allows for clean process fluid to fill a cavity of the tapping point and eliminates the possibility of the higher density process fluid migrating up the bore of the tapping point.

A tapping point clearing apparatus (e.g. installed behind an isolation valve) will stroke the scraper through a clean purge filled bore into the process fluid and retract back through the clean filled tapping point bore, diluting the amount of debris on the clearing head/shaft and thereby extending the life cycle of the wiper rings of the tapping point clearing apparatus.

Such an inclined installation also reduces the volume of purge fluid that otherwise enters the process fluid and ultimately dilutes the process fluid which has a negative impact on process unit efficiency.

The volume of purge fluid required to be used with the tapping point clearing apparatus in the inclined orientation would only be that amount displaced by the scraper and shaft during the stroking cycle.

BRIEF DESCRIPTION OF THE DRAWINGS

One or more embodiments of the present invention will hereinafter be described with reference to the accompanying drawings, in which.

DESCRIPTION OF PREFERRED EMBODIMENT

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
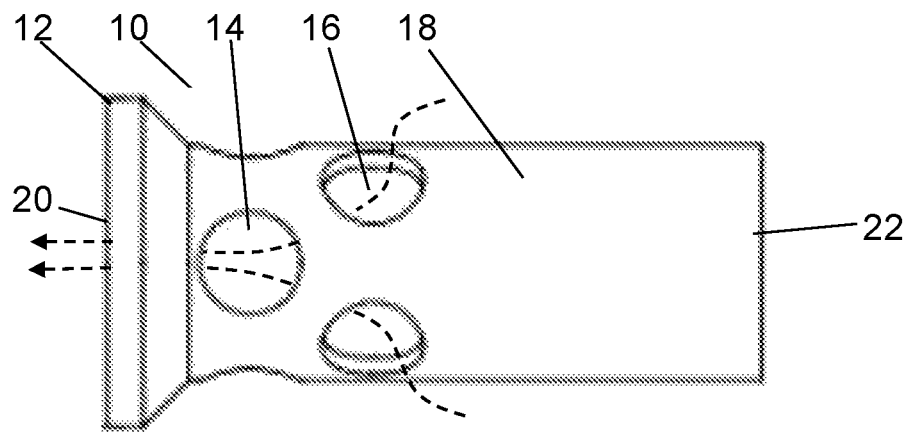
FIG. 1 shows a side view of a clearing head according to an embodiment of the present invention.
Figure 2:
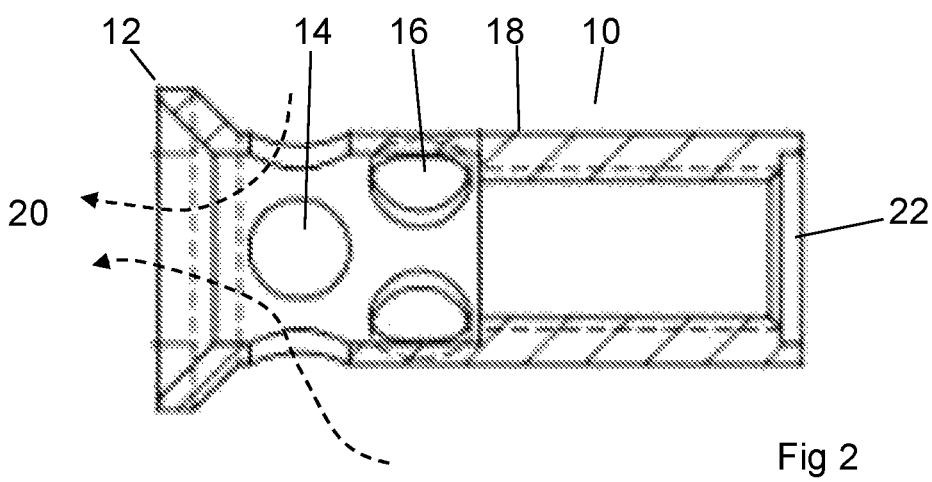
FIG. 2 shows a sectional view of a clearing head according to an embodiment of the present invention.
Figure 3:
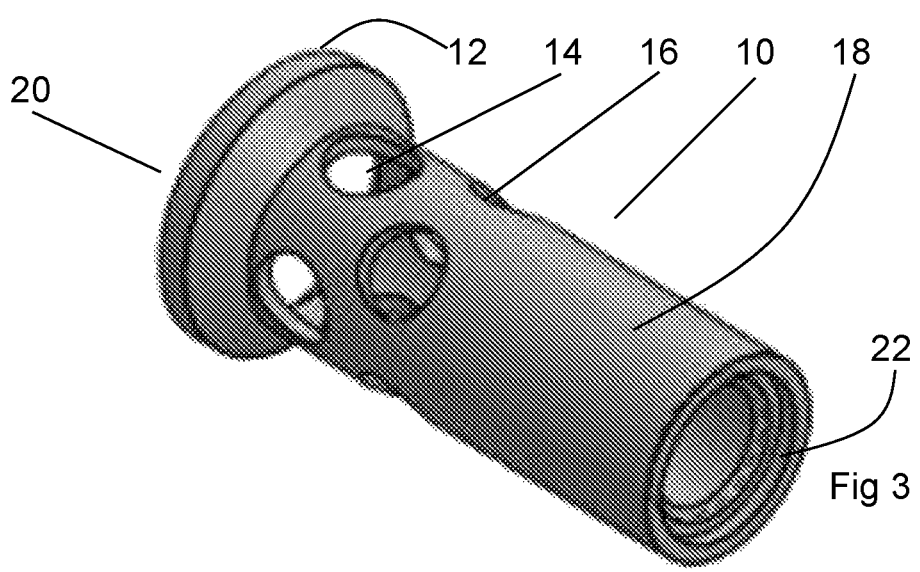
FIG. 3 shows a perspective of a clearing head according to an embodiment of the present invention.

FIGS. 1 to 3 show a clearing head 10 (aka scraper tip) according to an embodiment of the present invention.

The clearing head includes an annular scraper edge 12 and two rows of openings 14, 16 offset to one another. The scraper edge is preferably a sharp edge for enhanced scale removal.

The openings are through a side wall 18 of the clearing head providing a flowpath (dashed line representations in FIG. 2) for purge fluid from an exterior side of the clearing head and out through a front opening 20. It will be appreciated that three or more rows of openings can be provided.

The openings may be offset one row to the next, or may be aligned with the openings of one row axially in line with the openings of the next row.

The clearing head 10 can include a rear opening 22 for receiving a leading end of a shaft. It will also be appreciated that the clearing head and shaft can be made as a single piece, such as by machining a solid blank.

Dashed lines represent flow of purge fluid/pressure through the clearing head.

Figure 4:
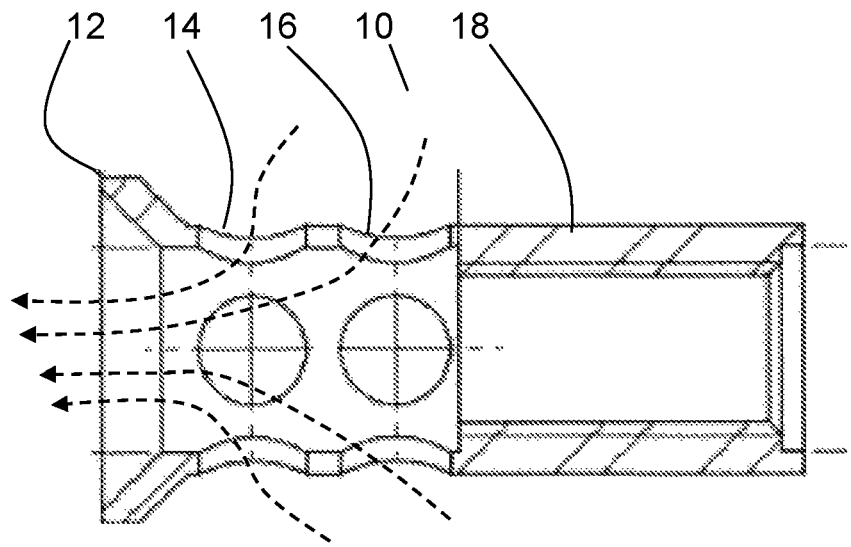
FIG. 4 shows a sectional view of a clearing head according to an alternative embodiment of the present invention.
Figure 5:
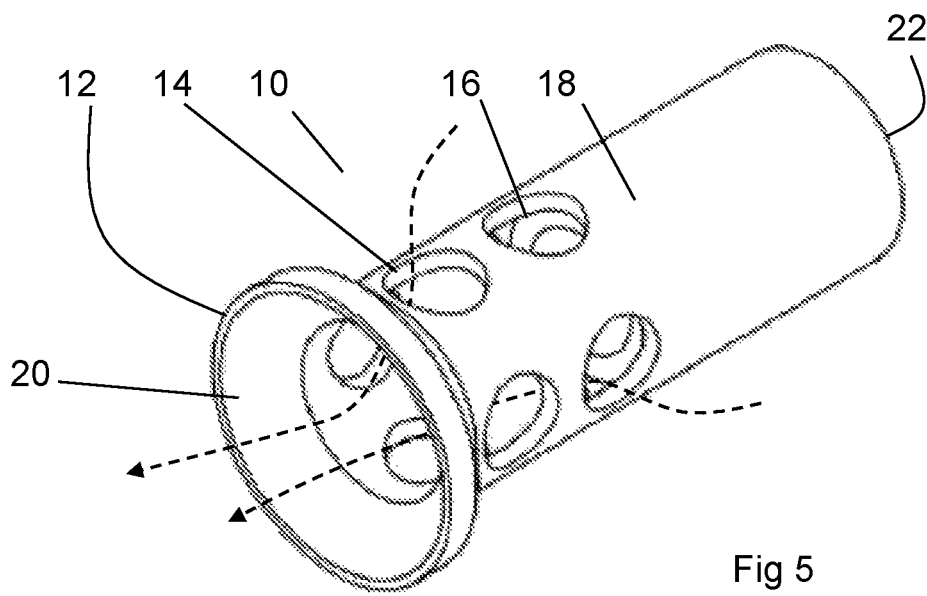
FIG. 5 shows a perspective of a clearing head according to an alternative embodiment of the present invention.

FIGS. 4 and 5 show an alternative form of the clearing head 10 embodying the present invention. In this embodiment, the openings 14, 16 are arrangement in aligned rows such that the openings of one row are aligned axially along the clearing head with the openings of the next row. This compares with the offset openings of respective rows of the embodiment shown in FIGS. 1 to 3.

It will be appreciated that position and number of openings 14, 16, and the number of rows of openings, can vary. For example, there may be a greater number of smaller openings than shown and/or a greater number of rows of openings. The openings need not be provided in rows along or around the clearing head.

Preferably, the openings provide a total opening area at least equal to a cross sectional area of at least a portion of a purge feed to the clearing head. For example, preferably a total cross-sectional area of the openings being of at least 80 $mm^2$, more preferably of at least 82 $mm^2$, yet more preferably at least 86 $mm^2$. The total cross sectional area of the openings may be between 50 $mm^2$ and 100 $mm^2$, preferably between 60 $mm^2$ and 90 $mm^2$, more preferably between 70 $mm^2$ and 90 $mm^2$, and yet more preferably between 80 $mm^2$ and 86 $mm^2$.

Figure 6:
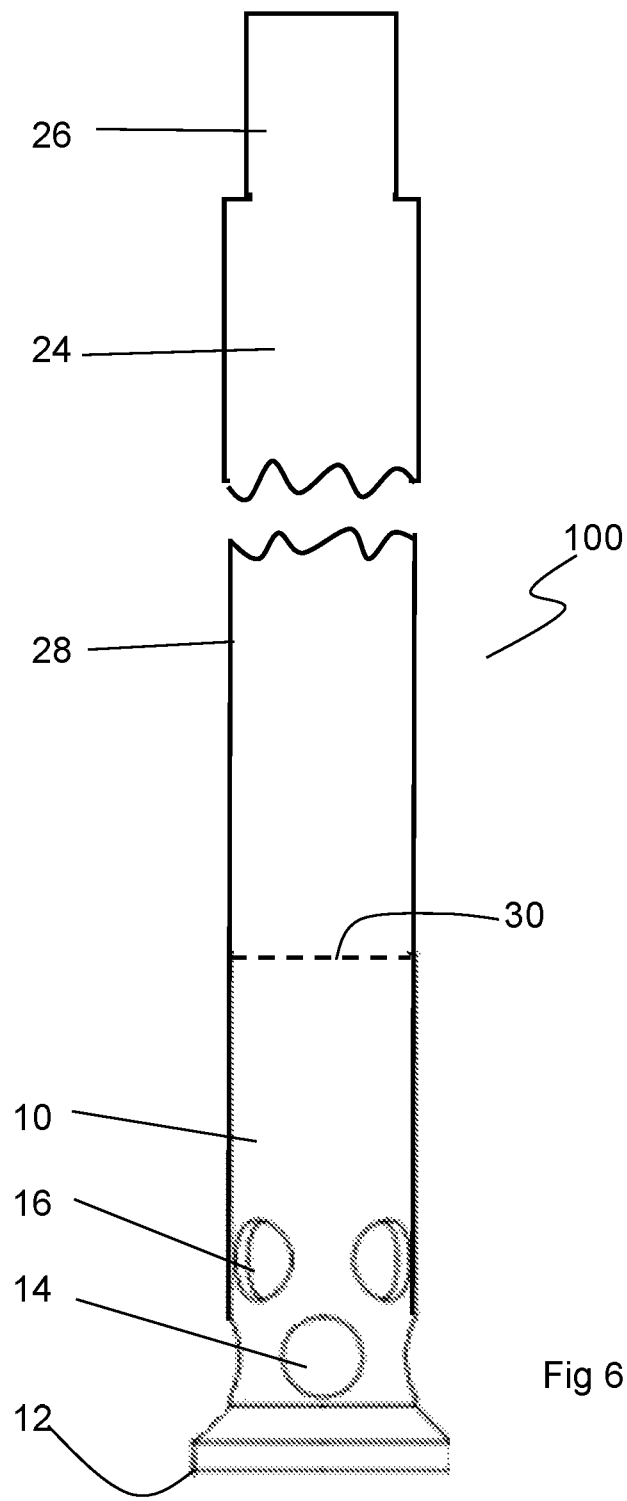
FIG. 6 shows a side view of a one-piece clearing head and shaft for a ram of a tapping point clearing apparatus according to an embodiment of the present invention.

FIG. 6 shows a clearing tool 100 according to an embodiment of the present invention. The clearing tool 100 provides a one-piece combined shaft 24 and clearing head 10.

The shaft includes a narrowed portion 26 relative to a main shaft portion 28. The narrowed shaft portion is arranged and configured to engage in a piston (not shown in FIG. 6)

The clearing head and shaft can be made as a single component i.e. machined form a single blank or can be two components (clearing head and shaft) welded together to form an integral, one-piece clearing tool.

In FIG. 6, the dashed line 30 represents a weld line where two parts (shaft and clearing head) may be joined by welding to form the one-piece clearing tool. Thus, it will be appreciated that permanently joining two components or forming form a single blank or part worked template part can provide the one-piece clearing tool.

Figure 7A:
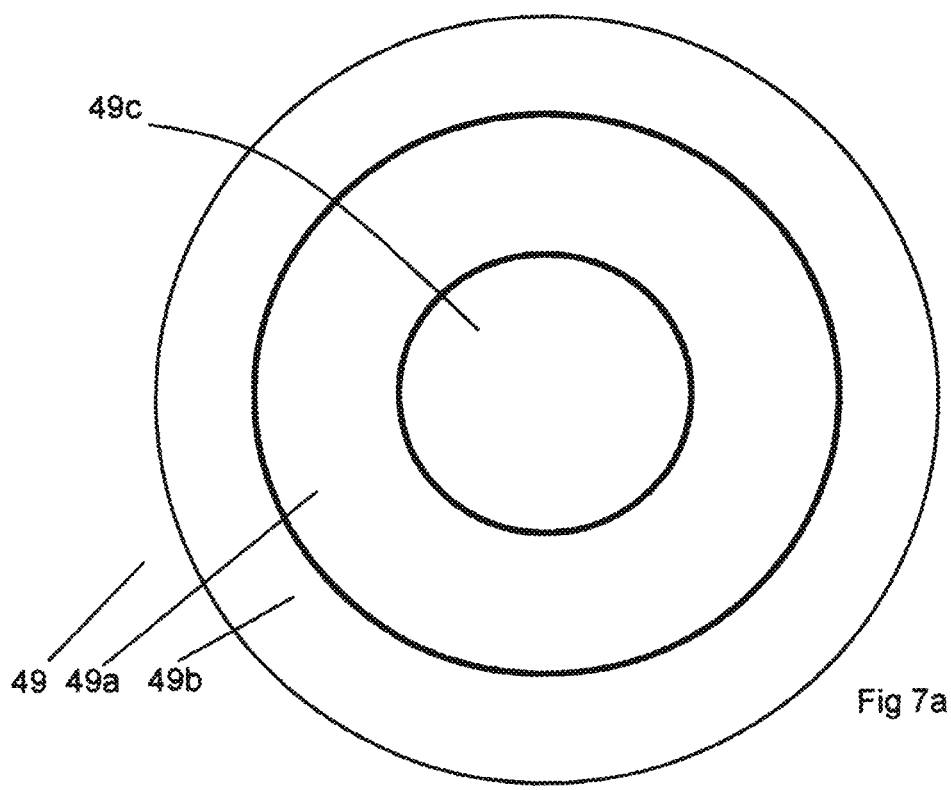
FIGS. 7a and 7b show respective side and end views of a wiper ring 49 according to an embodiment of the present invention.
Figure 7B:
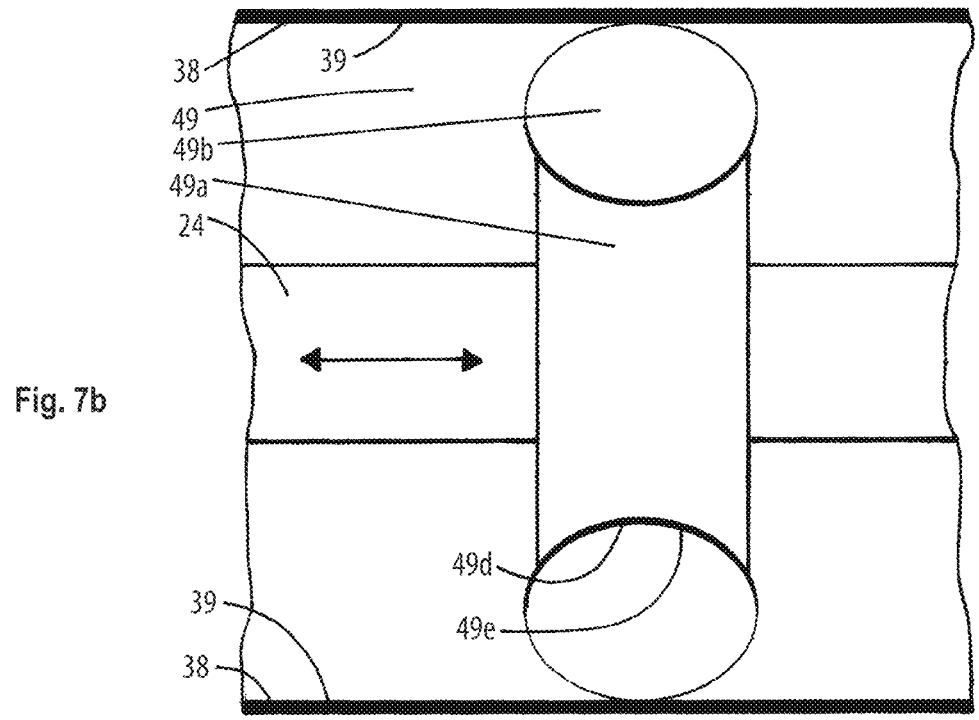

FIGS. 7a and 7b show respective side and end views of a wiper ring 49 according to an embodiment of the present invention.

The wiper ring 49 includes an inner first material 49a around an opening 49c therethrough for the shaft 24.

The first material preferably incorporates molybdenum, such as molybdenum disulphide.

A resilient second material 49b is provided around the first material. The resilient second material may be or include FKM (such as Viton™), which can be a replaceable O-ring.

Preferably the first material includes an annular channel 49d e.g. an anticlastic type structure the outer surface 49e of the first material.

The shaft 24 passes through the central opening 49c of the wiper ring and, in use, the wiper ring is retained static within the ram of the tapping point clearing apparatus (see FIG. 8) and the outer surface of the shaft is wiped clean by contact of the first material.

Figure 8:
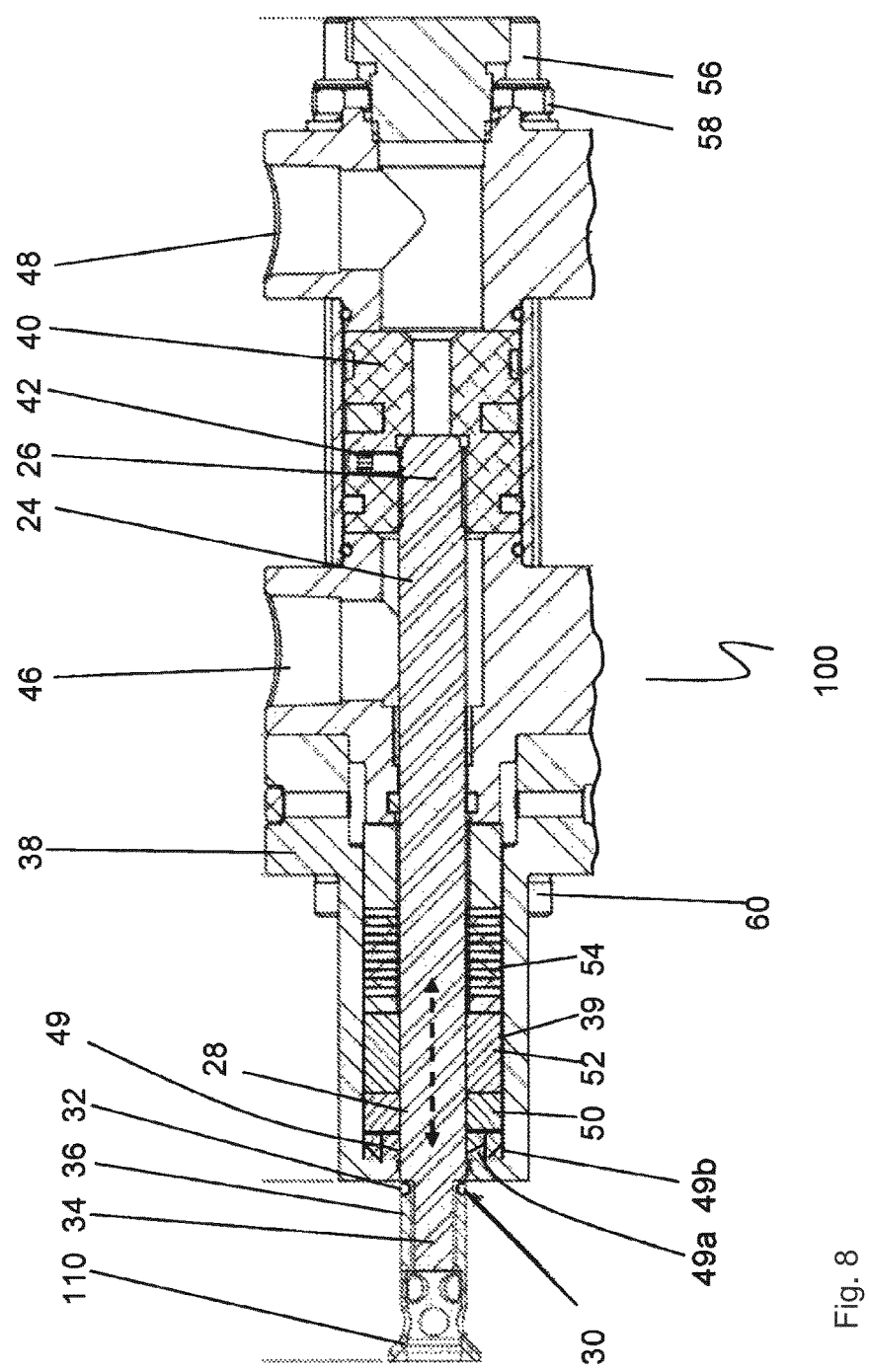
FIG. 8 shows a sectional view of a ram for a tapping point clearing apparatus according to an embodiment of the present invention.

When assembled into the ram, the resilient second material, preferably an FKM material, applies inward radial pressure to the first material by reacting against an interior wall 39 of the ram 38 (see FIG. 8).

FIG. 8 shows a tapping point clearing apparatus 110 including a clearing tool 100 incorporating a one-piece shaft and clearing head.

The shaft 24 and clearing head 10 are welded together by a bead of weld 32 around a circumferential join line 30.

Preferably the shaft has a forward end 34 that is received within a hollow body 36 of the clearing head, which may include a threaded joint between the shaft end and the clearing head, or may be a push fit with only the weld permanently connecting the shaft and clearing head together.

The tapping point clearing apparatus may include a ram 38 (such as a pneumatic, preferably double acting ram).

The ram 38 can include a piston 40 connected to the narrowed 26 'piston end' of the shaft 24. The piston and shaft may be retained together by a retainer 42, such as a grub screw.

The piston may be provided within a (double-acting) cylinder 44 of the ram. Preferably the cylinder has an inlet/outlet 46, 48 either side of the piston for input and release of operating pressure (e.g. pneumatic pressure).

The tapping point clearing apparatus 110 includes a wiper ring 49, optional secondary wiper ring(s) 50, seal(s) 52 and biasing means 54. The wiper ring 49 may react against an inner wall 39 of the ram 38 e.g. to provide an inward radial pressure to the shaft 24 and/or ensure that the wiper ring remains correctly placed.

The wiper ring 49 has a composite structure including a first material 49a around a central opening of the wiper ring and a second material 49b around the first material, wherein the second material is resilient (e.g. is springy or acts like a spring, reacting contact with an internal surface of the ram and ensuring that the first material remains in contact with the surface of the shaft to prevent process fluid, debris and/or purge fluid reaching/affecting the seal(s)). Thus, the resilient second material 49b can provide the external periphery of the wiper ring 49.

The first material 49a may include a metal based medium, such as molybdenum, forming the inner material.

The first material 49a may include molybdenum disulphide impregnated polyurethane.

The second material 49b can include a synthetic rubber and/or fluoropolymer elastomer. Preferably the second material 49b includes FKM (aka Viton™).

The FKM can provide an elastomer in the family including one of, or a combination of two or more of, the following: copolymers of hexafluoropropylene (HFP) and vinylidene fluoride (VDF or VF2), terpolymers of tetrafluoroethylene (TFE), vinylidene fluoride (VDF), hexafluoropropylene (HFP), perfluoromethylvinylether (PMVE).

The fluorine content can be between 66% and 70%.

The second material can have a density of over 1800 kg/m$^3$.

It will be appreciated that the wiper ring includes the first material to wipe clean the stroking shaft of the clearing tool, and the second material is resilient (acting like a spring). Such structure compensates for temperature fluctuations caused by the relatively cool shaft repeatedly extending into a hot process flow, expanding and then retracting, or temperature effects through the cover(s)/cylinder, and applying contact/pressure to the shaft through the inner first material by the resilient second material reacting against the interior of the ram.

The tapping point clearing apparatus 110 can include at least one secondary wiper ring 50, behind the aforementioned wiper ring 49. The secondary wiper ring(s) may include or be formed of a strong, heat resistant material, such as Kevlar.

One or more seals 52 can be provided to prevent actuating fluid for the ram from leaking into the process fluid at the front end of the ram or letting process fluid leak into the ram. It is notable that the wiper ring 49 (and optionally the secondary wiper ring(s) 50, if provided) wipes clean the shaft and removes debris (process fluid and/or scale) before affecting the seals. The one or more seals can be formed of or include polytetrafluoroethylene (PTFE) and/or gaphoil.

One or more biasing means 54, such as one or more washers (e.g. Belleville washers) can be provided within the ram to apply pressure to the seal(s). Belleville washers are cone shaped when in relaxed position, and they energize" or "live load" the process seal(s) 52.

The ram may be retained together by a number of tie rods 56 with fasteners 58, 60. The fasteners can be removed and the piston exposed such that the shaft can be released from the piston and the clearing tool removed from the front end of the ram, such as for servicing (e.g. including replacement of the one-piece clearing tool).

Figure 9:
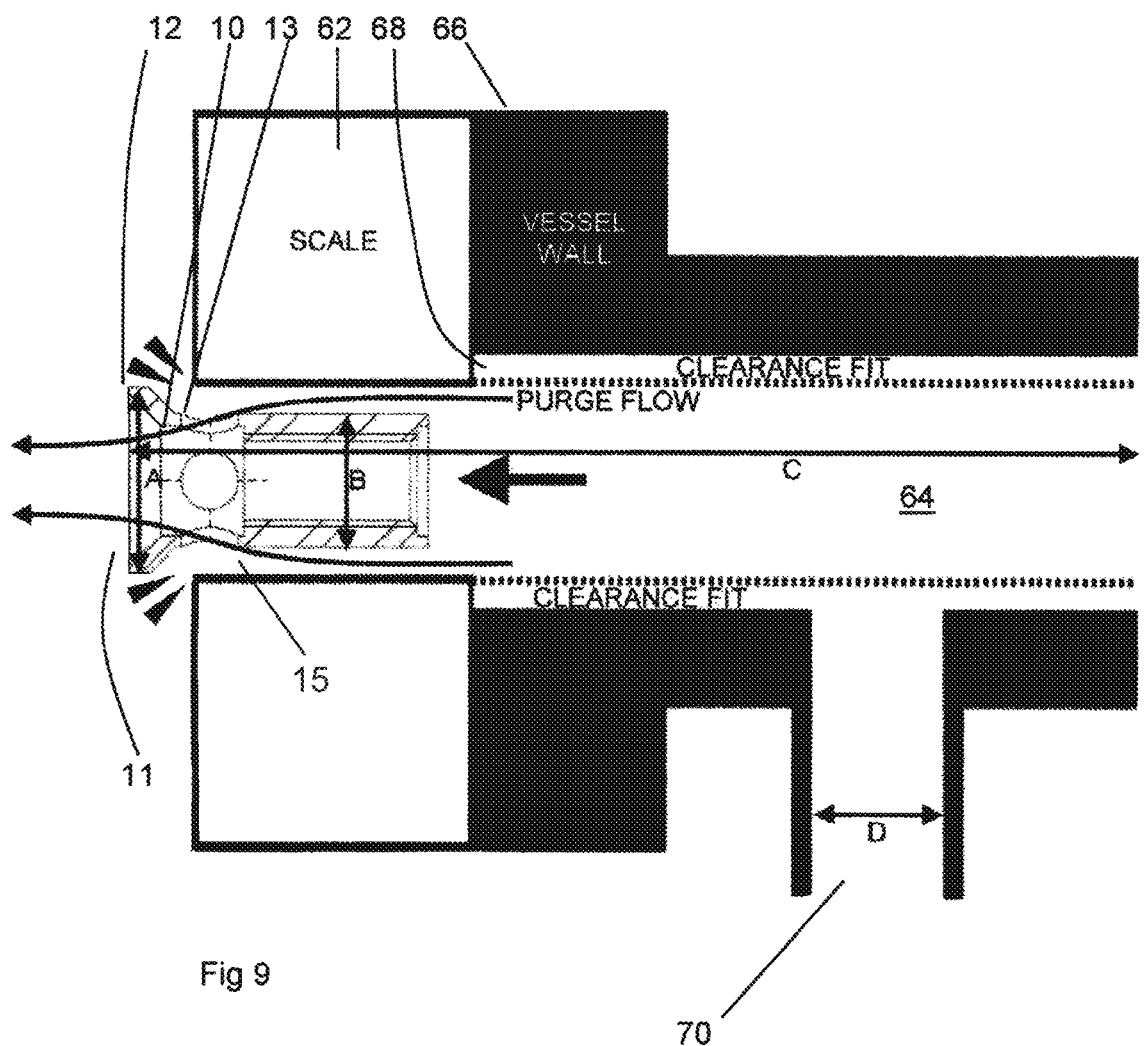
FIG. 9 shows a chart representing purge flow through a clearing head according to an embodiment of the present invention.

FIG. 9 shows a representation of purge flow through a clearing head 10 having a single row of openings 13. The clearing head 10 removes scale 62 from a tapping point 64 of a vessel 66.

The clearing tool 10 has a clearance fit 68 in the tapping point 64.

A scraper tip 11 of the clearing head 10 has an outside diameter (OD) A. The shaft/clearing head body has an outside diameter (OD) B. Stroke length of the clearing tool (distance travelled extending or retracting) is marked by the double arrow line C. A purge flow line/impulse flow line 70 has an inside diameter (ID) D and a cross sectional area $\pi(D/2)^2$.

The purge flow is preferably an inert gas or liquid or combination thereof. Inert refers to being inert relative to the process chemicals, but may also be generally inert (unreactive).

It will be appreciated that purge back pressure spike can be generated if flow through the clearing head is restricted during stroking because of scale build up and small openings through the clearing head reducing the overall surface area for purge fluid flow through and past the clearing head.

By one or more embodiments of the present invention maintaining a minimum area for purge flow to pass through and around the clearing head, erroneous backflow/pressure spikes can be avoided. Therefore, one or more embodiments of the present invention aim to maintain the effective opening area of the tapping point to be at least as large as the purge flow cross sectional area.

With this in mind, one or more forms of the present invention provides a clearing tool or clearing head for a clearing tool for use in a tapping point clearing apparatus that maintains a flow though area of at least a purge flow conduit cross sectional area.

Consequently, even if the scraper/clearing head becomes stuck while extended (and thereby partially occluding the tapping point opening 15, a minimum flow area is maintained, and erroneous purge flow back-pressure spikes otherwise caused by the clearing head) are avoided.

Figure 10:
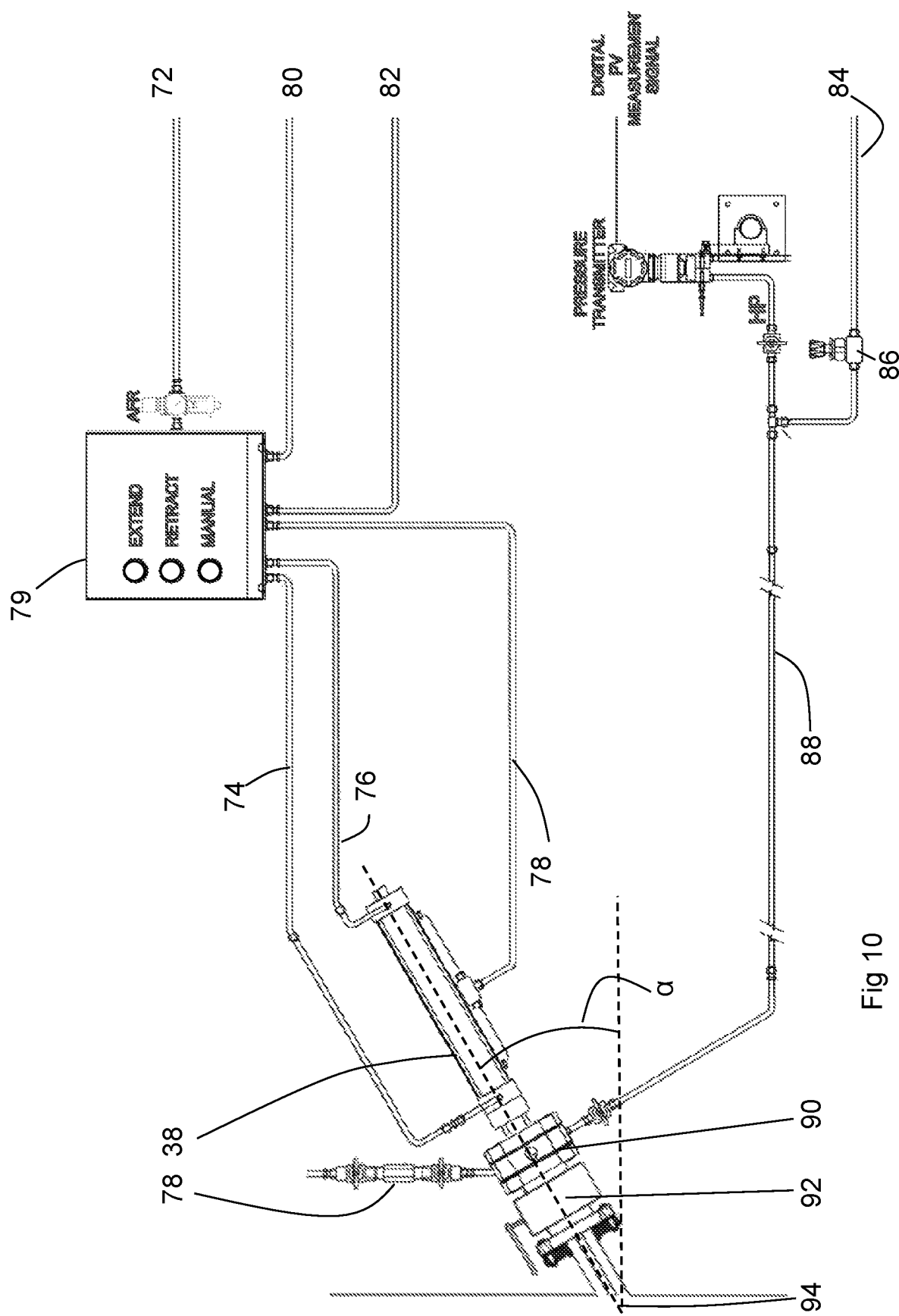
FIG. 10 shows a tapping point clearing apparatus and system according to at least one embodiment of the present invention.

FIG. 10 shows a double acting tapping point clearing ram 38 connected to a retract air supply 74 and an extend air supply 76. Ram piston position indicator feedback 78 is also provided to indicate whether the piston, and therefore the shaft and clearing tool is extended, retracted or partway between.

A controller 79 directs air from an air supply 72 to the extend or retract supply.

Position indicator feedback/control 80 and power supply 82 also connect to the controller.

The tapping point clearing apparatus ram 38 is inclined from horizontal and inclined from vertical (i.e. the tapping point clearing apparatus is not horizontal or vertical) by an angle α.

The angle of inclination from horizontal or vertical is preferably between at least 10° and 80°, more preferably between at least 20° and 70°, even more preferably between at least 30° and 60°, and yet more preferably between at least 25° and 45°, and still more preferably around 30°.

Purge fluid is provided via a purge fluid supply 84 and purge flow is measured by a purge flow meter 86.

Purge fluid is provided via conduit 88 to a purge inlet 90 between the ram 38 and a process vessel/pipe 94.

An isolation valve 92 is provided to isolate the process vessel/pipe from the ram, such as when the ram needs removal for servicing.

Purge fluid is almost always lighter/less dense than process fluid, hence an arrangement using an inclined tapping point clearing apparatus ensures process fluid cannot migrate uphill and reside inside the isolation valve thereby compromising the isolation valve's ability to seal when needed.

Purge fluid can be a liquid or a gas.

Diluting process fluid off the shaft of the clearing tool as it retracts ensures that the isolation valve (between the tapping point clearing apparatus ram and the process tapping point/vessel) seals closed when it is required to. This is so that the tapping point clearing apparatus/ram can be removed from service to change out the seals or fix accessories. In such cases, the isolation valve must seal tight.

If process fluid has migrated into the bore of the isolation valve over time and settled along the lower internal half of the bore of the valve, when an attempt is made to close that isolation valve it can jam open, and other times the abrasive scale will scrape over and scratch the sealing surface such that the valve leaks even when ostensibly closed.

An inclined tapping point clearing apparatus helps to eliminate air bubbles in cases where a liquid purge fluid is used or helps to eliminate condensation in cases where a gaseous purge fluid is used.

What is claimed is:

1. A tapping point clearing apparatus comprising:
a ram, the ram comprising a clearing tool, the clearing tool comprising:
a clearing head, the clearing head comprising:
a side wall, the side wall defining:
a front opening;
at least one side wall opening; and
a flow path between the at least one side wall opening and the front opening for purge fluid to flow through the clearing head; and
a scraper edge for removal of build-up/scale from a tapping point; and
a shaft; and
a wiper ring for, in use, wiping the shaft of the clearing tool, the wiper ring having a composite structure including:
a first material around a central opening of the wiper ring; and
a second material at least partially around the first material, the second material being resilient and providing an external periphery of the wiper ring;
wherein the clearing head is permanently connected to the shaft; and
wherein:
the first material includes metal or is of metal or is metal based;
the first material includes molybdenum;
the first material includes molybdenum disulphide impregnated polyurethane;
the second material includes a synthetic rubber and/or fluoropolymer elastomer; and/or
the second material includes FKM.

2. The tapping point clearing apparatus of claim 1, wherein the at least one side wall opening comprises two or more rows of openings positioned circumferentially around the clearing head.

3. The tapping point clearing apparatus of claim 2, wherein:
the rows of openings are spaced such that the openings of one row are axially aligned along the clearing head with respect to another row of openings; or
the rows of openings are spaced such that the openings of one row are offset with respect to the openings of another row.

4. The tapping point clearing apparatus of claim 2, wherein a total opening area of the two or more rows of openings is at least equal to a cross sectional area of an interior area of a flow conduit, impulse line or pipe, or a purge flow conduit/pipe.

5. The tapping point clearing apparatus of claim 1, wherein the clearing tool is machined from a single blank of material or a metal billet.

6. The tapping point clearing apparatus of claim 1, wherein the clearing head is affixed to the shaft by welding, brazing or another non-releasable attachment.

7. The tapping point clearing apparatus of claim 1, wherein:
the shaft includes a stepped end having a reduced diameter configured to be received within the clearing head; and
an outside diameter surface portion of the clearing head has a diameter matching an outside diameter of a wider diameter portion of the shaft than the stepped end.

8. The tapping point clearing apparatus of claim 1, wherein the shaft has a connection end distal from the clearing tool, the connection end including connection means for attachment of the clearing tool to a piston.

9. The tapping point clearing apparatus of claim 1, wherein the ram includes:
a cylinder for housing a piston;
first and second opposed end covers for sealing opposed ends of the cylinder; and
at least one tie member for use in clamping the opposed end covers to the ends of the cylinder.

10. The tapping point clearing apparatus of claim 1, wherein:
the tapping point clearing apparatus is installed in-situ in a process installation;
the tapping point clearing apparatus is inclined at an incline to horizontal; and
the ram is inclined from horizontal and inclined from vertical.

11. The tapping point clearing apparatus of claim 1, wherein:
the second material acts as a resilient means; and
resilience of the second material compensates for movements in the shaft during its stroke.

12. The tapping point clearing apparatus of claim 1, wherein the wiper ring is provided in addition to at least one sealing ring and/or at least one secondary wiper ring.

13. The tapping point clearing apparatus of claim 12, wherein:
the at least one secondary wiper ring includes polyparaphenylene terephthalamide; and/or
the at least one sealing ring includes a synthetic resin and/or a graphite material.

14. The tapping point clearing apparatus of claim 12, wherein the wiper ring sits in front of the at least one sealing ring.

* * * * *